United States Patent [19]

Houck et al.

[11] 4,436,198
[45] Mar. 13, 1984

[54] CONVEYOR BELT SYSTEM HAVING A PHASE SHIFT INDICATOR AND ADJUSTER FOR OPTIMUM TUNING OF A SYNCHRONOUS RIP DETECTOR CIRCUIT

[75] Inventors: Robert J. Houck, Akron, Ohio; Kevin J. King, Coon Rapids, Minn.

[73] Assignee: The B. F. Goodrich Company, New York, N.Y.

[21] Appl. No.: 353,712

[22] Filed: Mar. 1, 1982

[51] Int. Cl.$^3$ .............................................. B65G 43/06
[52] U.S. Cl. ...................... 198/502; 198/810; 198/856; 340/676; 364/550; 307/311; 307/515
[58] Field of Search .................. 328/155; 198/856; 307/311, 511, 515; 340/676; 364/550

[56] References Cited

U.S. PATENT DOCUMENTS

| | | | |
|---|---|---|---|
| 3,731,113 | 5/1973 | Lowe et al. | 198/502 |
| 3,845,375 | 10/1974 | Stiebel | 198/856 |
| 4,106,005 | 8/1978 | Asakawa | 340/676 |
| 4,228,513 | 10/1980 | Doljack | 364/550 |

Primary Examiner—John S. Heyman
Attorney, Agent, or Firm—M. J. Colitz, Jr.

[57] ABSTRACT

Existing conveyor belt rip detection systems presently incorporate a synchronous detector circuit for increasing the rejection of electrical noise. In order for the detector circuit to work at peak efficiency, the input signal occurring when an antenna is over the detector probes must be tuned in phase with the reference signal. The circuit to effect such tuning includes a light emitting diode as an indicator for determining the optimum phase tuning of the oscillator signal through the probes and antennae to a related synchronous detector for achieving maximum signal to noise ratio. A thumb wheel switch is employed to shift the phase of one of the signals with respect to the other to effect the tuning while the light emitting diode is utilized to detect when the thumbwheel switch has shifted the signals into an optimum synchronous relationship.

3 Claims, 6 Drawing Figures

CONVEYOR BELT SYSTEM HAVING A PHASE SHIFT INDICATOR AND ADJUSTER FOR OPTIMUM TUNING OF A SYNCHRONOUS RIP DETECTOR CIRCUIT

TECHNICAL FIELD

The present invention relates to AC signal generators and, more particularly, to an improved digital phase shift circuit signal generator having a detector and adjustor especially useful in conveyor belt rip detectors.

BACKGROUND

In large endless non-metallic conveyor belts, which may have metal reinforcing cables therein, used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt.

One such conveyor belt rip detector is disclosed in U.S. Pat. No. 3,792,459 issued to Snyder. In such rip detector plural antennas, which may be single electrical conductors, are embedded in the belt transversely to its length at spaced apart locations in the belt. An electrical signal is coupled by respective antennas from a transmitter to a receiver as the belt moves and the respective antennas pass in capacitive coupling relation with the transmitter and receiver at a rip detector station, and the receiver thus delivers an input signal to detector circuitry which interprets the same as an indication of satisfactory belt integrity. However, a broken antenna, for example at a place where the belt has been ripped, will not couple the transmitter signal through to the receiver, and the detector then senses the same as an indication of the occurrence of a rip condition. The detector circuit in such patent is operative after the lapse of a predetermined time period corresponding to the passage of a given number of broken antennas past the rip detector station to produce a distinguishable output that activates an alarm and/or deactivates the conveyor belt drive.

A number of improvements for use in conveyor belt rip detectors are disclosed in U.S. Pat. No. 4,228,513 issued to Doljack. One of such improvements includes a means for detecting the progress of the conveyor belt to know when an antenna should be at the rip detector station. If there is no antenna present then, a prompt shutdown of the conveyor belt drive may be effected.

Further improvements are disclosed in U.S. application Ser. No. 288,882 filed July 31, 1981 in the names of Haylett et al. That disclosure relates to a digital phase shift circuit signal generator for improved rip detection capabilities. The circuit of that disclosure includes means accurately to adjust and to control the relative phase shift between the transmitted AC transmitter signal and the reference or demodulating signal so that the phase of the demodulating signal will be at least substantially the same as that of the AC transmitter signal. The entire disclosure of the aforementioned Haylett application, including the prior art patents and applications referred to therein, are hereby incorporated by reference into the instant application.

The present invention relates to improved electrical means for adjusting the synchronism between transmitted and received electrical signals and for determining, and particularly for providing an indication of, the phase shift relationship between such signals.

With the foregoing in mind, an object of the invention is to improve conveyor belt rip detector apparatus.

Another object of the instant invention is to detect the synchronous relationship between a transmitted signal and a reference signal to improve the rip detection capabilities of a conveyor belt system.

A further object is to tune a synchronous rip detector circuit of a conveying assembly.

These and other objects and advantages of the present invention will become more apparent from the following description.

To the accomplishment of the foregoing and related ends, the invention comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF INVENTION

Figure 1:
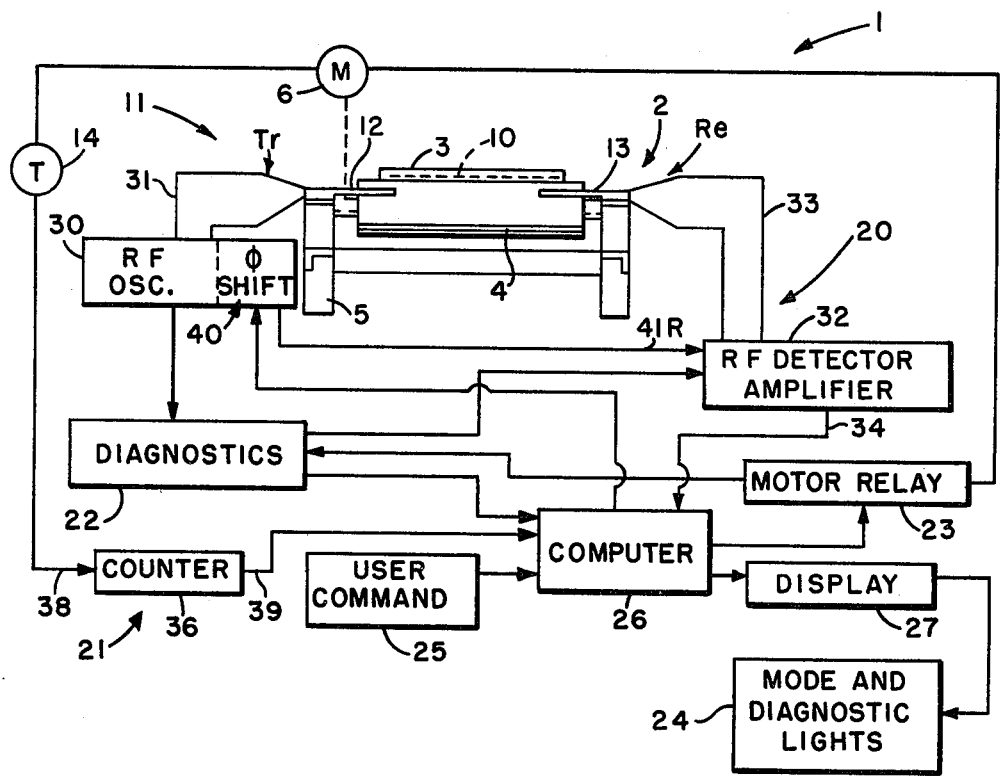
FIG. 1 is a schematic system diagram of a conveyor belt system with which the conveyor belt rip detector monitor system of the present invention may be used.
Figure 2:
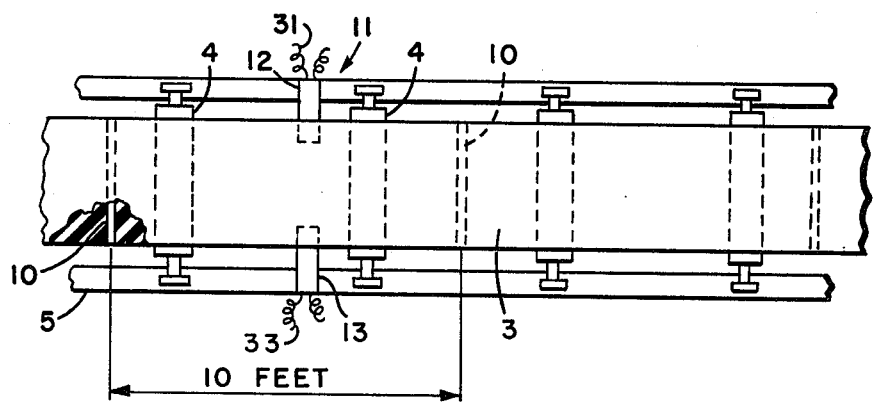
FIG. 2 is a fragmentary top plan view schematically showing the conveyor belt, antennas therein, and a rip detector station.

Referring to FIGS. 1 and 2, a monitor system generally indicated at 1 is shown in association with a conveyor belt system 2 for detecting a rip, tear, or other similar flaw, hereinafter collectively "rip", in the conveyor belt 3. The belt 3, which may be a conventional endless, nonmetallic conveyor belt, is supported by rollers 4 at longitudinal stations along a support frame 5 and is driven by a motor 6 which turns a drive roller.

The transducer technique for observing the structural integrity, or lack of the same, e.g. a rip, of the belt 3 uses a plurality of antennas 10 embedded in or otherwise carried by the belt generally transversely to the travel direction thereof and at a rip detector station 11 a transmitter plate 12 of a transmitter Tr and a receiver plate 13 of a receiver Re. Each antenna 10 may be a single electrical conductor of relatively small gauge, or other type of electrical conductor, such as a wire, a conductive fabric, or reinforced tire cord, or the like, which is passing the station 11, capacitively to couple with the transmitter and receiver plates 12, 13 to couple an electrical signal therebetween. Such signal coupling indicates the structural integrity of the antenna and proximate portions of the belt 3; the lack of such signal coupling where it is expected to occur generally indicates a flaw, such as a break in the antenna and a rip in the proximate portion of the belt 3.

As the belt 3 progresses in its process of traveling along its length, the monitor system 1 continuously looks for the sequential cyclical occurrence of events, namely the passing of the respective antennas by the rip detector station 11. The monitor system 1 also particularly observes the progress of such process by monitoring the rotation of the motor 6 or drive roller with a conventional tachometer 14, and correlates such progress information with the detected event information to sense promptly when an event has been missed. Upon missing one or more events, the monitor system 1 may promptly stop the motor 6 to shut down the conveyor belt system 2 minimizing any rip damage to the belt.

The fundamental components of the monitor system 1 include an event detector 20, a progress detector 21, a diagnostics portion 22, a shutdown control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 for capacitive coupling to and through an antenna 10. The detector 20 includes an oscillator 30, which produces an AC electrical signal, preferably in the radio frequency range, for example, on the order of about 25 KHz. to less than about 200 KHz., delivered by an electrical connection 31 to the transmitter plate 12 (this is the transmitted transmitter or antenna signal A); and a detector amplifier 32 coupled to the receiver plate 13. The transmitter TR includes the plate 12 and oscillator 30, and the receiver Re includes the plate 13 and detector amplifier 32. When an antenna 10 passes in proximity to the transmitter plate 12 such AC signal is capacitively coupled to the antenna and from the antenna to the receiver plate 13 (this is the received transmitter or antenna signal A') for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26.

Progress of the belt movement is detected by the progress detector 21, which includes the progress transducer tachometer 14 and a counter 36. The tachometer 14 produces in conventional manner a series or train of electrical pulses on line 38. The frequency of such pulse train preferably is directly proportional to the rotational speed of the motor 6 and, accordingly, directly proportionately represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal received on bus 39. When the next event detect signal is received, the computer 26 again reads and stores the progress signal received on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate in a rip detect mode. In the rip detect mode the computer 26 compares the progress signal received on bus 39 with the relevant value of information from the stored table to determine when an antenna 10 should be present at the rip detector station 11. If there is a whole, unbroken antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and may operate the start stop control portion 23 to stop the belt 3 in order to minimize any damage thereto.

Preferably the start stop control portion 23 is a relay that controls energization and deenergization of the motor 6 and/or a conventional clutch and braking system for the conveyor belt system 2. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc. to effect operational control of the monitor system.

Figure 3:
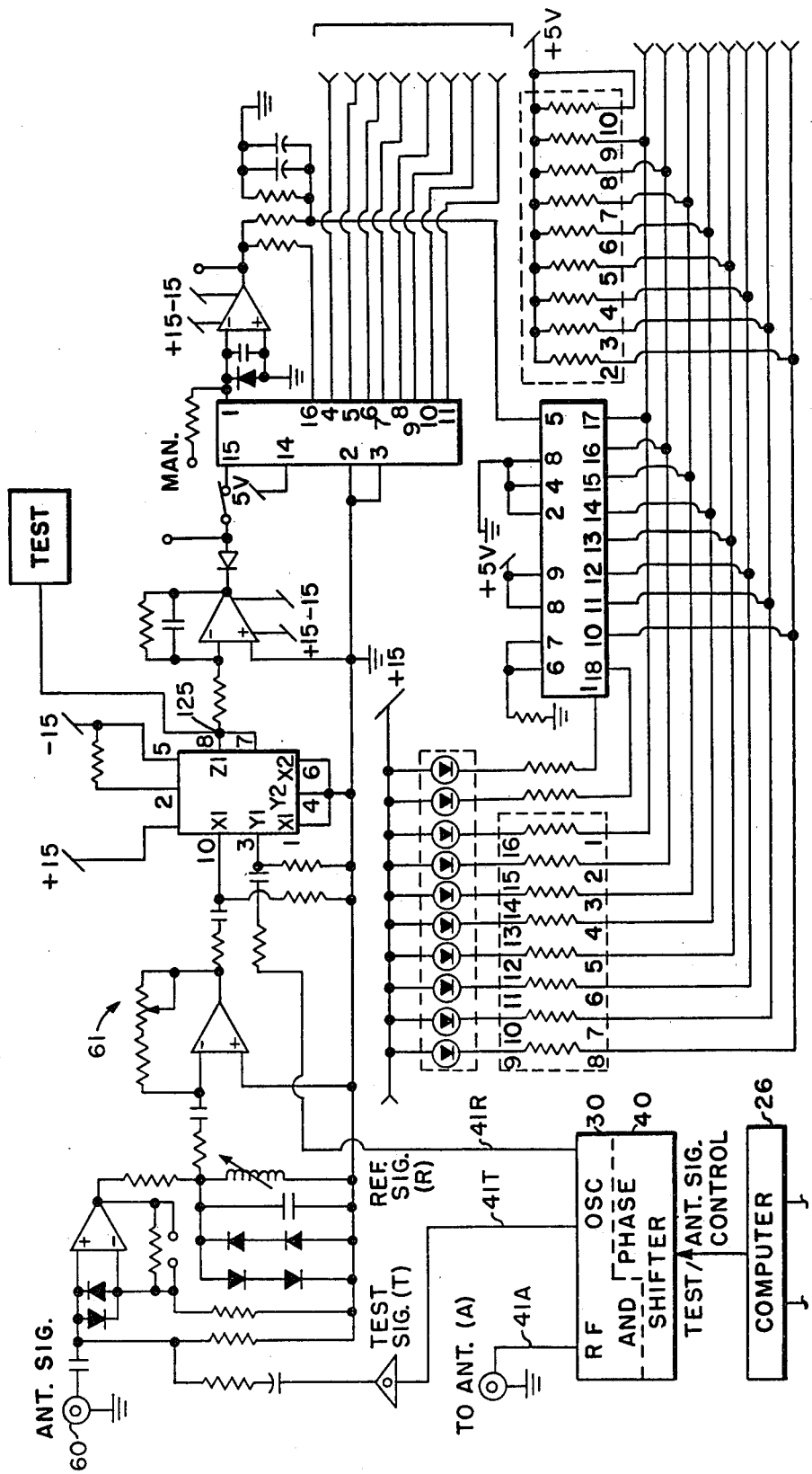
FIG. 3 is a schematic electric circuit diagram of a signal control circuit apparatus using a lock in amplifier.

As shown particularly in Fig. 3, RF oscillator 30 has associated with it a digital phase shift circuit 40, which is controlled by the computer 26, to produce AC signals on lines 41A, 41T, and 41R; the signals on those lines all are AC signals having the same frequency but, perhaps, different phases, and those signals are identified, respectively, as an antenna signal A, a test signal T, and a reference signal R. Ordinarily, the reference and test signals are in phase, and the antenna signal is shifted in phase therefrom by an amount selected by the operator of the system 1.

The digital phase shift circuit 40 is described below specifically with reference to FIG. 5.

The antenna signal A on line 41A is coupled to the transmitter plate 12. When an integral antenna is aligned at the rip detector station 11, it will couple the antenna signal to the receiver plate 13, which in turn, is coupled by an input terminal 60 to a signal control circuit apparatus 61 of the detector amplifier 32. The antenna signal received at the input terminal 60 is pulse modulated increasing and decreasing in magnitude as an antenna approaches and leaves the detector station 11. Preferably no signal at the antenna signal frequency will be received by the receiver plate 13 when no antenna is proximate the same. However, it is possible, and in many cases quite likely, that electrical noise will be received at the receiver plate 13 and at terminal 60, whether or not any antenna is present at the rip detector station 11.

Moreover, and very importantly, as has been noted above, the phase of the received antenna signal received at the receiver plate 13 has been found to be shifted from the phase of the transmitted antenna signal A actually produced on line 41A.

Figure 4:
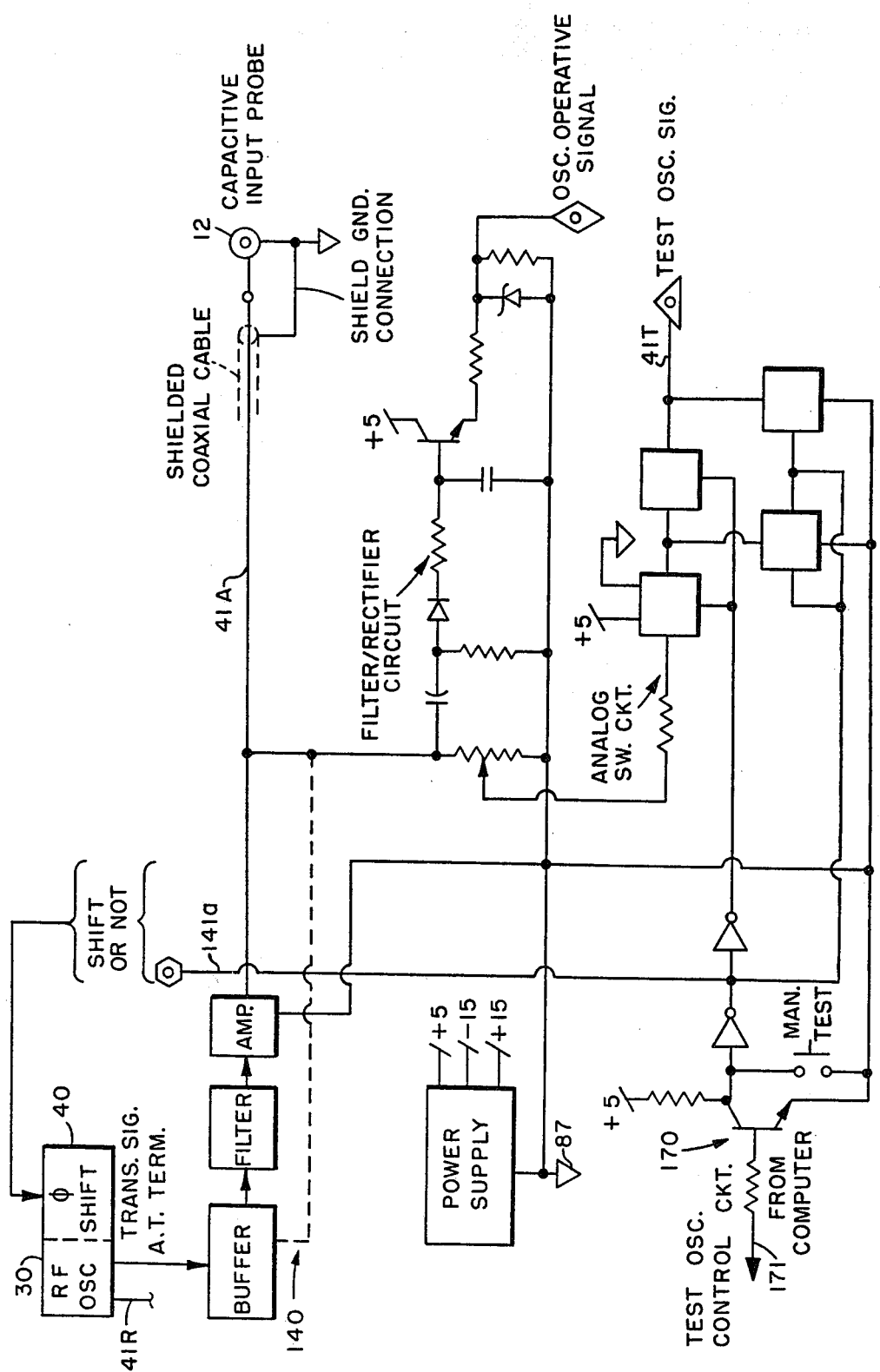
FIG. 4 is a schematic electric circuit diagram of a signal output and switching circuit.

Further details of the signal control circuit of FIG. 3 and of the signal output and switching circuit of FIG. 4 can be had by reference to the aforementioned Haylett application. Briefly, it is a purpose of such circuits to eliminate, or at least to reduce, such electrical noise while accommodating the noted phase shift, and this is accomplished in part, using a lock in amplifier approach with analog multiplier 101. At the output 125 of such multiplier 101 is produced a series of positive pulses when a proper antenna signal is received or when a proper test signal is received by the signal control apparatus 61.

The circuit 40, first of all, includes a frequency divider circuit 201 formed by a pair of binary counters 202, 203, such as integrated circuits model No. N8281A, that count the pulses input to their respective input ports 204, 205 and, accordingly, produce output digital information at their parallel output ports 206, 207. The parallel digital data on the six lines of such output ports 206, 207 represent a time frame representation of the immediate development of the reference signal R. In other words, the instantaneous digital value of the parallel information at such output ports 206, 207 represents how far along in each of its periodic cycles is the reference signal. Such reference signal R is derived from output port 208 of the finary counter 203 and is coupled via inverting amplifier 209 and terminal 210 to line 41R. As it is output from the binary counter 203, the reference signal R is a balanced square wave signal divided by 64 from the 4 MHz. signal of the oscillator 30 so as to have a frequency of 62.5 KHz.

The digital phase shift circuit 40 also includes a digital phase shifter 220, a phase shift setting device 221, and an output circuit 222. The phase shifter 220 is formed by a pair of digital comparators 223, 224, such as integrated circuits model No. 93S46, and the setting device 221 may include one or more individual thumbwheel switches contained, for example, in a discrete thumbwheel strip switch 225 model No. 2A2110026. The output circuit 222 may be a plurality of NAND gates contained in a single integrated circuit model No. 74LS00 and connected as a latch or set reset flipflop.

In response to respective pulses sequentially produced at output lines 226, 227 from the comparators 223, 224 which are coupled to input ports of the output circuit 222, the latter delivers a square wave signal, the transmitter signal, via the transmitter signal terminal 228 to the circuit 140 (FIG. 4) for developing either the antenna signal A of test signal T.

Figure 5:
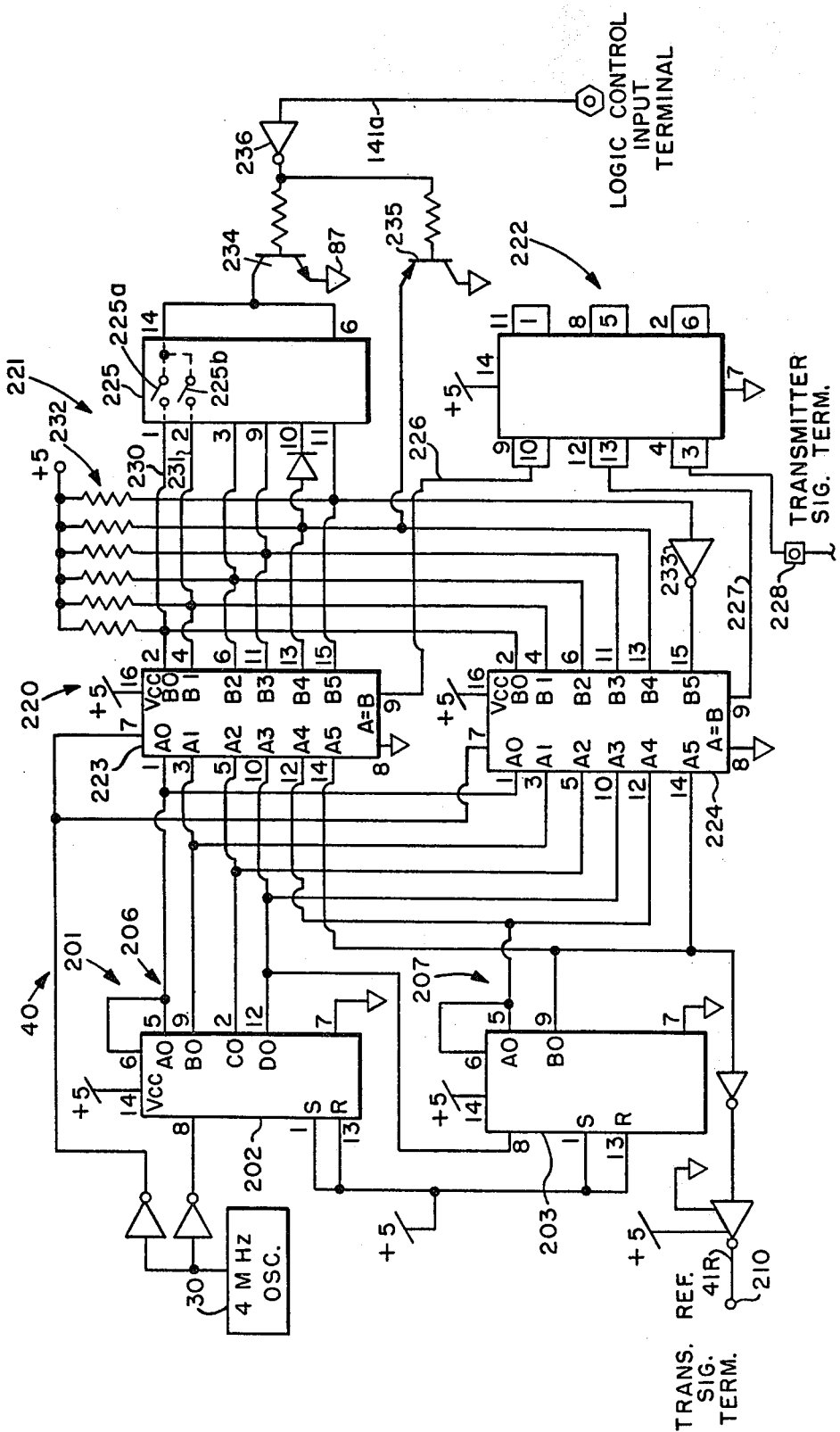
FIG. 5 is a schematic electric circuit diagram of a digital phase shift circuit.

Each of the comparators 223, 224 has six A input ports connected by respective lines, as is shown in FIG. 5, of the output ports 206, 207 of the counters 202, 203. Each comparator also has six B input ports connected, as is shown, to respective switch terminals of the setting device 221, such as terminals 230, 231. The B input ports ordinarily tend to be biased to a 5 volt logic 1 signal level by respective resistors 232. An inverting amplifier 233 assures that the sixth B input port B5 of comparator 224 will be biased to an opposite logic level relative to that of the sixth B input port B5 of the comparator 223. The actual logic level to which each of the B input ports is biased is a function of adjustment and control of the setting device 221. Since the respective A input ports of the two comparators are coupled in parallel and since the respective B input ports are connected in parallel, i.e. except for the noted inversion by amplifier 233, the signals produced on lines 226, 227 will be spaced apart in time by the time required to complete one half of a complete counting cycle of the counter/frequency divider 201. Specifically, when the same parallel digital information is provided at the A and B input ports of a respective comparator, such comparator produces a logic 1 signal at its A=B output terminal, which is coupled to either line 226 or 227.

The phase relation of the signals on lines 226, 227, and, thus of the transmitter signal produced by the output circuit 222 to the reference signal R at terminal 210 depends on the setting device 221. Such setting device 221 further includes phase shift control transistors 234, 235 coupled via buffer/driver inverting amplifier 236 to respond to the signals received from the circuit 170 (FIG. 4) on line 141a. Assuming initially that the transistor 234 is conductive to complete a ground 87 circuit connection for the thumbwheel switches 225, the transistor 235 is nonconductive. Closure, then, of any of the individual thumbwheel switches, e.g. 225a, 225b, etc. in the device 225, will draw to ground reference potential or logic 0 level the B input port to which such switch is connected, thus, changing the count value on the parallel output port lines or bus of the counters 202, 203 that must exist for the respective pulse signals to be produced at the A=B output terminals/lines 226, 227 of the comparators 223, 224. Accordingly, when the phase shift control transistors 234, 235 are conducting and nonconducting, respectively, the phase relation between the transmitter signal delivered to the transmitter signal terminal 228 and the reference signal at terminal 210 will be a direct function of the open or closed setting of the individual thumbwheel switches in the device 225.

During ordinary use of the circuit 40, the thumbwheel switches are adjusted to parallel digital values or condition such that the received antenna signal A' and the reference signal R will be tuned to be in phase in the detector amplifier 32. When a rip appears to be detected, though, the computer 26 causes a signal on line 171 forcing the transmitter and reference signals to be in phase so that the operability of the transmitter, i.e. oscillator 30 and digital phase shift circuit 40 and the circuit of FIG. 4, and the receiver, e.g. the circuit of FIG. 3, can be checked to learn whether there is a fault in the rip detector monitor system 1 or a rip.

The phase shifter circuit 40 includes the thumb wheel switch 225 as mentioned above as well as other appropriate circuitry 300 for determining when movement of the thumb wheel switch has put the appropriate signals in synchronous relationship. Such circuitry 300 which is built into the circuit 61 includes a light emitting diode, LED, 3a and is functional to preclude the need for supplemental test apparatus, such as a cathode ray oscilloscope, which was used in the past, being brought to the site of the conveyor belt rip detection system in order to determine the state of tuning of the signals of the circuit.

Figure 6:
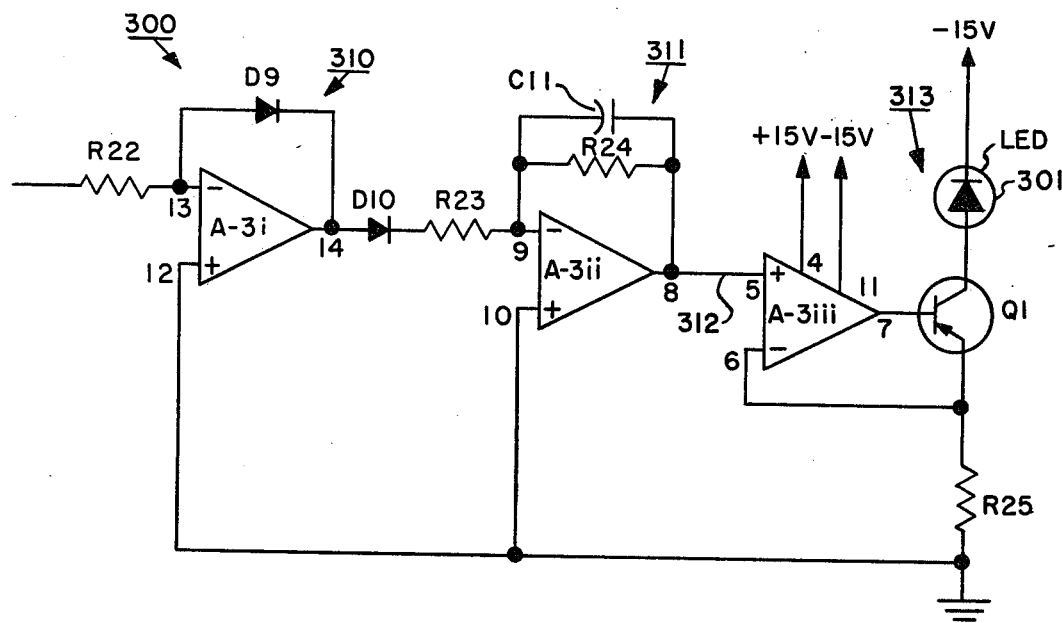
FIG. 6 illustrates a preferred circuit for the activating of a light emitting diode to indicate the proper synchronous tuning of the rip detecting circuit.

The test circuit 300 is shown in FIG. 3 with its specific elements shown in FIG. 6.

The synchronous nature of the signals is determined by sensing the wave form output to the transmitter probe at output 125 of analog multiplier 101 in FIG. 3 and feeding it through a resistor R22 forming part of a first stage 310 is composed of the component electronic elements. The first stage is composed of a logrithmic amplifier A-3i the purpose of this stage is to amplify the low level signals more than the high level signals input to resistor R22. The other input to the positive node of A3i is grounded. Diode D9 is in parallel with the amplifier A3i.

This first stage 310 is for amplifying received AC signals to a much greater extent than received high level DC signals. This will provide large discrimination between signals that are in phase, or nearly in phase, with the reference signal as compared to signals that are not in phase. Further, this first stage is also for rectifying the received low level AC signals to DC signals.

The second stage 311 of the test circuit includes diode D10, a resistor R23 and a second amplifier A3ii all connected in series. In parallel with amplifier A3ii is a resistor R24 and a capacitor Cll forming an RC circuit. This second stage of the test circuit rectifies the input signal and then integrates the signal received from the logrithmic amplifier A3i. The other input node of the second amplifier A3ii, is also coupled to ground. The combined output of the RC circuit with the output of the second amplifier A3ii are joined at point 312 and fed into a third amplifier A3iii which, with transistor Q1, light emitting diode D11 and resister R25 constitute the third stage 313 of the test circuit 300. The negative output of the third amplifier, A3iii, is coupled to ground through resistor R25. This third stage 313 provides current to the light emitting diode 311 porportionate to the voltage out of the integrator of the second stage 311. The entire right side of this circuit constitutes a voltage to current regulator which causes the light emitting diode, LED, to vary in brightness proportional to the voltage at point 312 to the LED so that the current flow and LED illumination is proportionate to the voltage seen at point 312. Therefore, the brightness of the LED is proportionate to the voltage at point 312 and the darker the LED the truer the synchronysm between the input and output antenna signals. In other words when an antenna is present between the probes, the LED will be brightest if the signals are out of phase and the LED will be darkest if the signals are in proper phase adjustment, an inversely proportional relationship.

The output from the operational amplifier of the third stage 313 of the test circuit 300 is fed to the base of transistor Q1 while the transistor collectors feeds the LED 301 and the emitter is fed to ground through resister R25.

This approach to tuning the signals of a synchronous circuit is superior to the use of a cathode ray oscilloscope since the circuitry of the present invention is integral with the circuitry on the circuit board of the system and does not require the bringing in of supplemental hardware, and connecting it to the system for being read by a technician skilled in the intrepreting of the scanning signals of a oscilloscope. In essence, any customer of the rip detector conveying system can set up the proper phase relationship and tuning of his conveyor belt rip detection system.

With the prior art oscilloscope tuning approach, it would take a skilled operator to read the observed wave forms on the oscilloscope screen whereas, in the present invention, even a casual operator can observe the changes of illumination in LED, D11. The LED is modulated in brightness with the inventive circuitry to determine a maximum phase synchronization across antennas by detecting voltage differentials at the output of the multiplier in the RF detector amplifier with the specific circuitry disclosed herein.

In view of the foregoing, it will be appreciated that the invention may be employed for signal detection and adjusting purposes in connection with conveyor belt rip detector apparatus and methods.

While the instant invention has been described with respect to a specific preferred embodiment, it is intended to be covered broadly within the spirit and scope of the appended claims.

What is claimed is:

1. In a conveyor belt assembly, with rip detection capabilities, a circuit for shifting the phase of one signal relative to another signal and for determining the synchronous relationship therebetween, comprising: first means for producing digital information directly coordinated with the instantaneous time frame development of such another signal, thumbwheel switch means for setting a predetermined phase relation of such one signal relative to such another signal, comparator means responsive to such digital information and said set means for producing an output signal representative of the phase of such one signal, output means responsive to such output signal for producing such one signal at a phase corresponding thereto and light emitting diode means for illuminating in intensity inversly proportionately to the degree of synchronization of the phase relationships.

2. A conveyor belt system having rip detecting capabilities, said system including a moveable belt having spaced conductive antennas for carrying electrical antenna signals thereacross, a signal emitter probe and a signal receiver probe positioned adjacent the moveable belt to emit and receive an antenna signal across the belt when a conductive antenna is therebetween, circuit means to create a reference signal and an antenna signal, thumbwheel switch means to shift the phase of the antenna signal with respect to the reference signal and light emitting diode means to indicate the degree of synchronization between the antenna signal and reference signal.

3. For use in a conveyor belt system with rip detection capabilities, a circuit for tuning the system comprising a first amplifier and a first diode in parallel and a rectifying diode in series therewith for amplifying low level AC signals to a much greater extent than high level DC signals, thus providing arge discrimination between signals that are in phase, or nearly in phase, with a reference signal as compared to signals that are not in phase and to rectify the low lead AC signals to DC signals, a second amplifier and an RC circuit in parallel to convert the high level DC signal to a highly filtered DC voltage, a third amplifier in series with a transister and a light emitting diode to produce a current proportionate to the highly filtered DC voltage whereby the intensity of the light emitting diode is inversely proportional to the low level AC signal.

* * * * *